June 13, 1933. B. R. LEGG 1,914,265
AUTOMATIC TRAILER BRAKE
Filed March 22, 1932  2 Sheets-Sheet 1
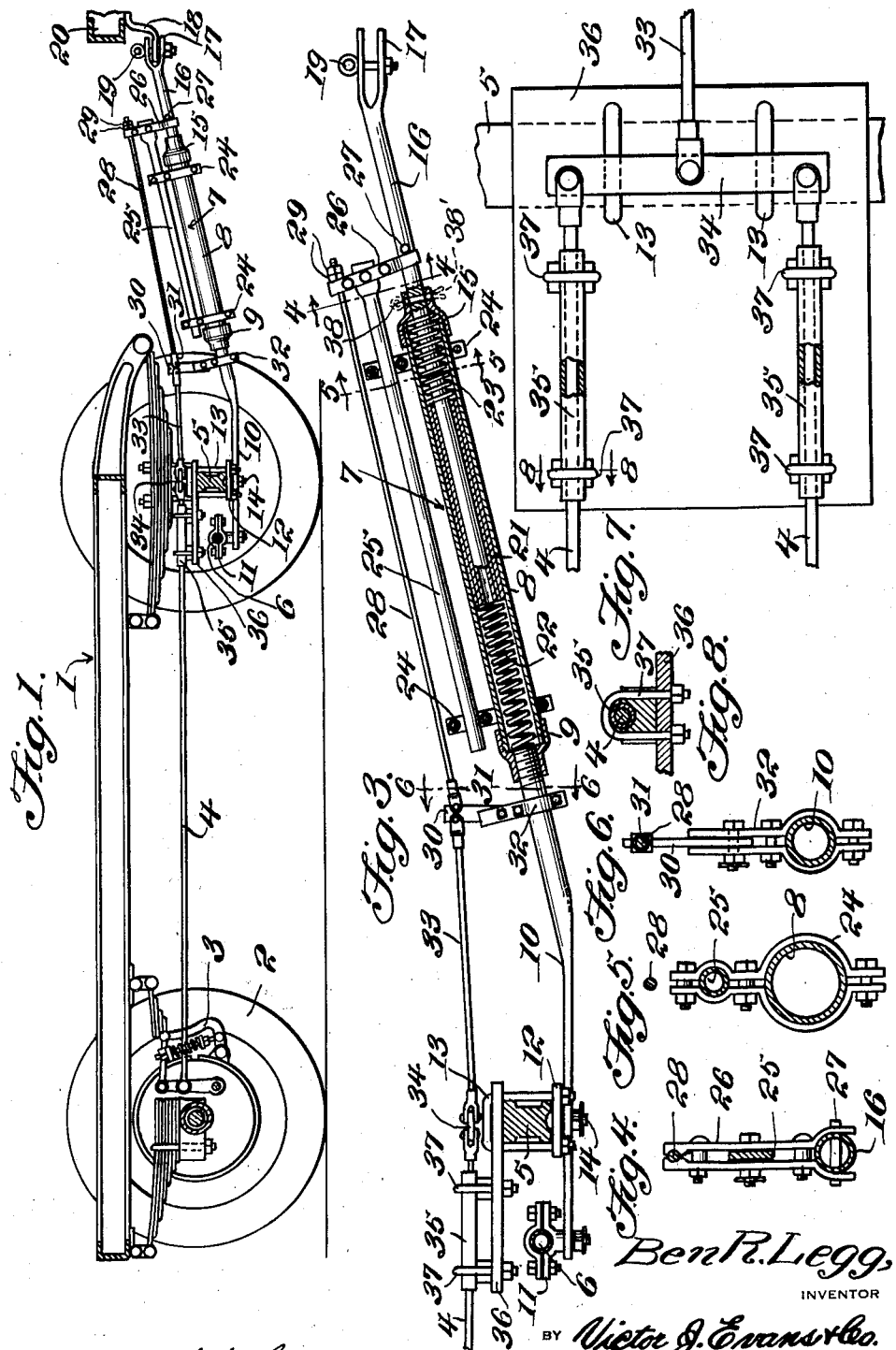
Ben R. Legg, INVENTOR
BY Victor J. Evans & Co. ATTORNEY
WITNESS: J. T. L. Wright June 13, 1933.   B. R. LEGG   1,914,265
AUTOMATIC TRAILER BRAKE
Filed March 22, 1932   2 Sheets-Sheet 2
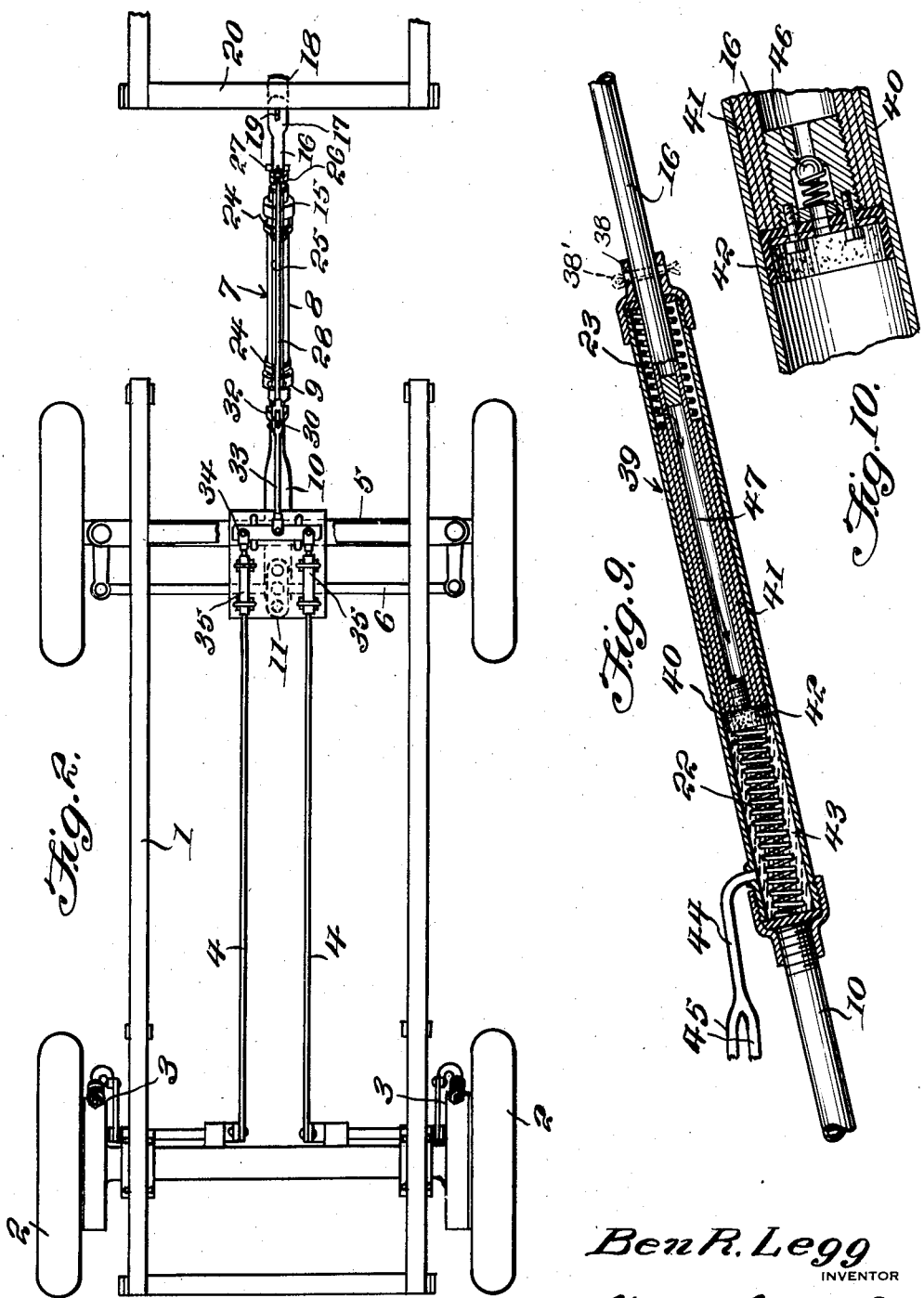
Ben R. Legg
INVENTOR Patented June 13, 1933

1,914,265

UNITED STATES PATENT OFFICE

BEN R. LEGG, OF MORRISTOWN, TENNESSEE

AUTOMATIC TRAILER BRAKE

Application filed March 22, 1932. Serial No. 600,489.

This invention relates to a combined coupler and brake applying device for trailers and has for the primary object, the provision of a device of the above stated character, whereby a trailer may be easily and quickly attached to a towing device and which will steer the front wheels of the trailer to cause the latter to readily follow the towing device and to automatically apply the brakes of the trailer during slowing down of the towing device or when traveling down steep grades where the tendency of the trailer is to overrun the towing device.

With this and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation partly in section illustrating a combined coupler and brake applying device applied to a trailer and to a towing device.

Figure 2 is a top plan view illustrating the same.

Figure 3 is an enlarged fragmentary sectional view showing the combined coupler and brake applying device attached to the front axle and steering mechanism of the trailer.

Figure 4 is a detail sectional view taken on the line 4—4 of Figure 3.

Figure 5 is a similar view taken on the line 5—5 of Figure 3.

Figure 6 is a similar view taken on the line 6—6 of Figure 3.

Figure 7 is a fragmentary plan view partly in section illustrating the equalizer for the brakes of the trailer.

Figure 8 is a detail sectional view taken on the line 8—8 of Figure 7.

Figure 9 is an enlarged sectional view illustrating the modified form of my invention wherein the coupler is capable of actuating hydraulic brakes.

Figure 10 is a detail sectional view illustrating a valved piston in my modified form of invention.

Referring in detail to the drawings, the numeral 1 indicates a trailer in which the rear wheels 2 thereof are provided with a brake mechanism 3 consisting of a pair of brake rods 4 extending forwardly to the front axle of the trailer. The front axle 5 is of the usual steering type customarily employed on motor vehicles, the steering knuckles being connected by the usual rod 6 forming part of the steering mechanism. The foregoing description relates to a well known type of trailer to which my invention is applied.

A combined coupler and brake applying means 7 consists of a cylinder 8 having attached to one end by a coupling 9, a tongue 10 that extends rearwardly under the front axle 5 of the trailer and has pivotally connected to its rear end a sectional clamp 11 secured to the rod 6 of the steering mechanism of the trailer. The clamp 11 fits within a notch or groove within the rod 6 to prevent the clamp from shifting its position on the rod. A plate 12 is secured to the under face of the axle 5 by U-clamps 13 and carries a pivot bolt 14 which extends through an aperture in a tongue 10 to pivotally connect the tongue to the axle. The head of the bolt 14 seats in a recess in the axle 5 to prevent shifting of the plate 12 on the axle.

A collar 15 is removably secured to the other end of the cylinder 8 and slidably receives a bar 16, the forward end of which is forked or bifurcated as shown at 17 to engage over a bracket 18 and pivoted thereto by a pin 19. The bracket 18 is secured to a towing device or vehicle 20. The rear or inner end of the bar 16 carries a head 21 having sliding engagement with the walls of the cylinder and the opposite ends thereof are engaged by coiled springs 22 and 23. The spring 23 is adapted to act as a cushion to absorb shocks when the towing vehicle starts the trailer in motion. When the trailer has a tendency to overrun the towing device the head 21 acts against the action of the spring 22, thus it will be seen that the head and bar 16 have sliding movement relative to the cylinder 8 during the use of the device.

Sectional clamps 24 are secured to the cylinder 8 and rigidly attach an actuating bar 25 to the cylinder, the forward end of which is pivoted to a lever 26, the lower end of which is bifurcated and straddles the bar 16. The bar 16 in advance of the lever is provided with a pin 27 to engage the forked end of the lever and limit the movement of the forked end of the lever relative to the bar in one direction. The upper end of the lever slidably receives a brake actuating rod 28, the forward end of which is screw-threaded to receiving adjusting nuts 29 engaging the upper end of the lever 26. The rear end of the rod 28 is pivoted to a lever 30 by a coupling 31. The lever 30 is pivoted to a bracket 32 secured to the tongue 10. A connecting brake rod 33 is pivoted to the lever 30 and to an equalizing bar 34. The equalizing bar 34 is pivotally connected to the forward ends of the brake rods 4 of the brake mechanism and said brake rods 4 are slidably mounted in sleeves 35 secured to a supporting plate 36 by clamps 37. The supporting plate is secured to the axle 5 of the trailer by the U-bolts 13.

In operation when the towing device 20 is slowed down or when the trailer has a tendency to overrun the towing device, the bar 16 moves relative to the cylinder 8 against the action of the spring 22. The movement of the cylinder 8 relative to the bar 16 causes a pivotal movement of the lever 26 which exerts a pull on the brake actuating rod 28. The pull on the rod 28 is transmitted to the brake rods 4 by the rod 33 and equalizing bar 34, thus applying the brakes of the trailer. During the pulling of the trailer by the towing device, the head 21 moves within the cylinder 8 against the action of the spring 23 which releases the brakes and also forms a cushion or shock absorbing means for the towing device when assuming the load of the trailer.

The collar 15 and the bar 16 may be provided with apertures 38 to receive a pin 38' when aligned for the purpose of rendering the brake applying device inoperative so that the trailer may be moved in a rearward direction by the towing device.

A turning movement of the coupler between the trailer and the towing device will affect the steering mechanism of the trailer to cause the latter to readily follow in the track of the towing device.

Referring to my modified form of invention as shown in Figures 9 and 10, the coupler 39 is designed for actuating hydraulic brakes on a trailer and includes a cylinder 40 attached at one end to the tongue 10 and its opposite end slidably receiving the bar 16 connected to the towing device. The head 41 of the bar 16 which is slidable in the cylinder works against the springs 22 and 23 and the head at one end carries a cup-shaped washer 42 to engage the walls of the cylinder to prevent leakage of fluid by the head. The cylinder between the head and the tongue 10 forms a fluid chamber 42 in communication with a pipe 44 having branches 45 connected to the hydraulic brakes of the trailer so that on movement of the head 41 towards the tongue 10 the fluid will be forced out of the chamber 42 to the brakes applying the latter, and a movement of the plunger in an opposite direction draws the fluid from the brakes into the chamber 43 thereby releasing the brakes. A spring pressed check valve 46 is located in one end of the head 41 or that end carrying the cup-shaped washer 42 for the purpose of allowing any fluid which may work by the head to return to the chamber 43 by the hollow portion 47 of the rod 16.

While I have shown and described the preferred embodiment of my invention, it will be understood that minor changes in construction, combination and arrangement of parts may be made without departing from the spirit and scope of my invention, as claimed.

Having thus described my invention, what I claim is:

1. A combined coupler and brake applying device comprising a cylinder, a tongue secured to the cylinder and pivoted to the axle and steering mechanism of a trailer, a coupling rod slidable in the cylinder and connected to a towing device, a head on the rod and slidable in the cylinder, cushioning means engaging the head, an actuating bar fixed to the cylinder, a lever pivoted to said bar and connected to the coupling rod for imparting pivotal movement to said lever during the movement of the cylinder and coupling rod relative to each other in one direction, and means for connecting the lever to the brake mechanism of a trailer.

2. A combined coupler and brake applying device comprising a cylinder, a tongue secured to the cylinder and pivoted to the axle and steering mechanism of a trailer, a piston slidable in the cylinder, cushion means for the piston, a coupling bar secured to the piston and to a towing device, an actuating bar fixed to the cylinder, a lever pivoted to the actuating bar and having one end forked to straddle the coupling bar, a pin carried by the coupling bar to engage the forked end of the lever, and means connecting the lever to the brake mechanism of the trailer.

3. A combined coupler and brake applying device comprising a cylinder, a tongue secured to the cylinder and pivoted to the axle and steering mechanism of a trailer, a piston slidable in the cylinder, cushion means for the piston, a coupling bar secured to the piston and to a towing device, an actuating bar fixed to the cylinder, a lever pivoted to the actuating bar and having one end forked to straddle the coupling bar, a pin carried by the coupling bar to engage the forked end of the lever, a brake operating rod slidable through the lever, means adjustably mounted in the brake actuating rod to engage the lever, and a brake equalizing device connected to the brake actuating rod and to the brake mechanism of the trailer.

In testimony whereof I affix my signature.

BEN R. LEGG.